(12) United States Patent
Lunt

(10) Patent No.: US 12,498,218 B2
(45) Date of Patent: *Dec. 16, 2025

(54) AERIAL VIDEO BASED POINT, DISTANCE, AND VELOCITY REAL-TIME MEASUREMENT SYSTEM

(71) Applicant: The United States of America, as represented by the Secretary of the Navy, Crane, IN (US)

(72) Inventor: Gary A. Lunt, Riverside, CA (US)

(73) Assignee: The United States of America, as Represented by the Secretary of the Navy, Washington, DC (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/219,255

(22) Filed: Jul. 7, 2023

(65) Prior Publication Data

US 2024/0068808 A1 Feb. 29, 2024

Related U.S. Application Data

(62) Division of application No. 17/407,772, filed on Aug. 20, 2021, now Pat. No. 11,740,080, which is a
(Continued)

(51) Int. Cl.
*G01C 3/08* (2006.01)
*B64U 10/13* (2023.01)
(Continued)

(52) U.S. Cl.
CPC ............... *G01C 3/08* (2013.01); *B64U 10/13* (2023.01); *B64U 20/87* (2023.01); *G01P 3/38* (2013.01); *G01S 19/485* (2020.05); *G01S 19/49* (2013.01); *G06T 7/246* (2017.01); *G06T 7/73* (2017.01); *G06V 20/52* (2022.01); *G08G 5/22* (2025.01); *G08G 5/26* (2025.01); *G08G 5/55* (2025.01); *G08G 5/57* (2025.01); *G08G 5/723* (2025.01); *G08G 5/74* (2025.01); *H04N 23/69* (2023.01); *B64U 2101/30* (2023.01); *B64U 2201/20* (2023.01); *G06T 2207/10032* (2013.01);
(Continued)

(58) Field of Classification Search
None
See application file for complete search history.

(56) References Cited

U.S. PATENT DOCUMENTS

2015/0055674 A1* 2/2015 Lin .................. G01J 5/0205
                                                        374/1
2016/0327950 A1* 11/2016 Bachrach ............. H04N 23/661

* cited by examiner

*Primary Examiner* — Stuart D Bennett
(74) *Attorney, Agent, or Firm* — Naval Surface Warfare Center Crane Division; Patrick B. Law

(57) ABSTRACT

A method of determining geo-reference data for a portion of a measurement area includes providing a monitoring assembly comprising a ground station, providing an imaging assembly comprising an imaging device with a lens operably coupled to an aerial device, hovering the aerial device over a measurement area, capturing at least one image of the measurement area within the imaging device, transmitting the at least one image to the ground station using a data transmitting assembly, and scaling the at least one image to determine the geo-reference data for the portion of the measurement area by calculating a size of a field-of-view (FOV) of the lens based on a distance between the imaging device and the measurement area.

14 Claims, 14 Drawing Sheets

Related U.S. Application Data division of application No. 15/162,580, filed on May 23, 2016, now Pat. No. 11,140,326.

(60) Provisional application No. 62/165,481, filed on May 22, 2015.

(51) Int. Cl.
*B64U 20/87* (2023.01)
*G01P 3/38* (2006.01)
*G01S 19/48* (2010.01)
*G01S 19/49* (2010.01)
*G06T 7/246* (2017.01)
*G06T 7/73* (2017.01)
*G06V 20/52* (2022.01)
*G08G 5/22* (2025.01)
*G08G 5/26* (2025.01)
*G08G 5/55* (2025.01)
*G08G 5/57* (2025.01)
*G08G 5/72* (2025.01)
*G08G 5/74* (2025.01)
*H04N 23/69* (2023.01)
*B64U 101/30* (2023.01)

(52) U.S. Cl.
CPC .............. *G06T 2207/30212* (2013.01); *G06T 2207/30236* (2013.01)

AERIAL VIDEO BASED POINT, DISTANCE, AND VELOCITY REAL-TIME MEASUREMENT SYSTEM

CROSS-REFERENCE TO RELATED APPLICATIONS

The present application is a divisional application of U.S. patent application Ser. No. 17/407,772, filed Aug. 20, 2021, entitled "AERIAL VIDEO BASED POINT, DISTANCE, AND VELOCITY REAL-TIME MEASUREMENT SYSTEM," which is a divisional application of U.S. patent application Ser. No. 15/162,580, filed May 23, 2016, entitled "AERIAL VIDEO BASED POINT, DISTANCE, AND VELOCITY REAL-TIME MEASUREMENT SYSTEM," now U.S. Pat. No. 11,140,326 B2, which claims the benefit of and priority to U.S. Provisional Patent Application Ser. No. 62/165,481, filed on May 22, 2015, and entitled "AERIAL VIDEO BASED POINT, DISTANCE, AND VELOCITY MEASUREMENT SYSTEM," the complete disclosures of which are expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200246US04) is assigned to the United States Government and is available for licensing for commercial purposes. Licensing and technical inquiries may be directed to the Technology Transfer Office, Naval Surface Warfare Center Corona Division, email: CRNA_CTO@navy.mil.

BACKGROUND OF THE DISCLOSURE

Oftentimes law enforcement and military personnel may need to obtain the geodetic position of a point, a distance from a nominally stationary or moving object, a distance of an impact from an absolute geodetic point, or the speed of a moving object. For example, during military operations, the distance that a large caliper weapon may miss a target center and, instead, impact the ocean or earth (i.e., the miss distance) is often required for training feedback and qualifications testing. Additionally, in law enforcement, it may be required to measure the speed of traffic on a roadway or highway.

Existing systems that gather miss distances traditionally have large logistical footprints, are expensive to acquire, expensive to operate, time consuming to deploy, and/or do not offer real-time results. Alternatively, personnel might attempt to use a small portable device for deployment in training areas in remote locations that are presently difficult to bring in large-scale equipment or that do not contain the necessary infrastructure or land-line power nearby to operate the equipment.

SUMMARY OF THE DISCLOSURE

The present invention relates to a measurement system or scoring system configured to operate in a variety of locations to measure distances, determine geodetic points, analyze speed of moving objects, and perform other spatial or velocity measurements or analyses. Generally, various embodiments of the present disclosure include an aerial video-based point, distance, and velocity measurement system that orients a video or static capture camera underneath an aerial platform which is configured to establish a measurement or coordinate area in which to detect geodetic points, distance between points relative to each other, and/or the velocity of objects moving within the area. In particular, some embodiments include systems for real-time measurements of absolute geodetic point positions, relative distances, distances from absolute geodetic positions, and/or vehicular velocities over a plurality of terrain, such as flat or irregular land or water. In some embodiments, a vertical camera scoring unit and/or a Global Navigation Satellite System (GNSS) may be used to measure or otherwise determine spatial distances or velocities.

Embodiments of the present disclosure may include the use of a solitary video camera operably coupled to an aerial platform (e.g., a drone, helicopter, plane, etc.), for example suspended in a nadir or plumb-bob orientation via a three-axes brushless gimbal, meaning that the camera may be oriented and face directly or straight down when coupled to the aerial device. As such, it is possible to obtain a direct overhead plan view of the monitored area. For example, embodiments of this disclosure can include a wireless or other untethered aerial platform that can maintain a stationary or moving hover over a particular area or may include a tethered or directly affixed video or other camera system which can provide overhead coverage of an area but that may be powered through a wired connection.

According to a first illustrative embodiment of the present disclosure, a measurement system comprises a monitoring assembly comprising a ground station configured to receive images of a measurement area and configured to select a portion of the measurement area shown in the images. The ground station comprises a scaling unit configured to scale the images of the measurement area. The measurement system also comprises an imaging assembly comprising an aerial platform configured to maintain a stationary or moving hover over the measurement area and an imaging device comprising a camera and lens operably coupled to the aerial platform, the imaging device being positioned in a nadir position and configured to capture a plan view of the images of the measurement area. A geodetic position of the portion of the measurement area is determined by the scaling unit of the monitoring assembly. Additionally, the monitoring device is configured to display an output of the absolute geodetic position of the portion of the measurement area.

According to a further illustrative embodiment of the present disclosure, a method of determining geo-reference data for a portion of a measurement area comprises providing a monitoring assembly comprising a ground station, providing an imaging assembly comprising an imaging device with a lens operably coupled to an aerial device, hovering the aerial device over a measurement area, capturing at least one image of the measurement area within the imaging device, transmitting the at least one image to the ground station using a data transmitting assembly, and scaling the at least one image to determine the geo-reference data for the portion of the measurement area by calculating a size of a field-of-view (FOV) of the lens based on a distance between the imaging device and the measurement area.

According to another illustrative embodiment of the present disclosure, a method of determining geo-reference data for a portion of a measurement area comprises providing a monitoring assembly comprising a ground station and a scaling unit and providing an imaging assembly comprising an imaging device with a lens operably coupled to an aerial device, an inertial measurement unit (IMU) configured to determine an attitude (e.g. roll, pitch, yaw) of the imaging device, and a global navigation satellite system (GNSS) configured to determine geo-reference coordinates of the imaging device. The method also comprises providing a data transmitting assembly comprising a telemetry consolidation unit operably coupled monitoring assembly and the imaging assembly. Additionally, the method comprises orienting the imaging device toward an object at a known distance between the imaging device and the object, determining a size of a field-of-view (FOV) of the lens at the known distance, calculating a ratio of the size of the FOV relative to the known distance, and storing the ratio in the scaling unit of the monitoring assembly. Also, the method comprises hovering the aerial device over the measurement area, capturing at least one image of the measurement area with the imaging device, transmitting, with the data transmitting assembly, the at least one image to the ground station, measuring, with the imaging assembly, a distance between the imaging device and the portion of the measurement area, transmitting, with the data transmitting assembly, the distance between the imaging device and the portion of the measurement area to the monitoring assembly, and scaling, with the scaling unit, the at least one image to determine the geo-reference data for the portion of the measurement area using the ratio stored in the scaling unit.

Additional features and advantages of the present invention will become apparent to those skilled in the art upon consideration of the following detailed description of the illustrative embodiments exemplifying the best modes of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Various embodiments of the invention described herein are not intended to be exhaustive or to limit the invention to precise forms disclosed. Rather, the embodiments selected for description have been chosen to enable one skilled in the art to practice the invention.

Figure 1:
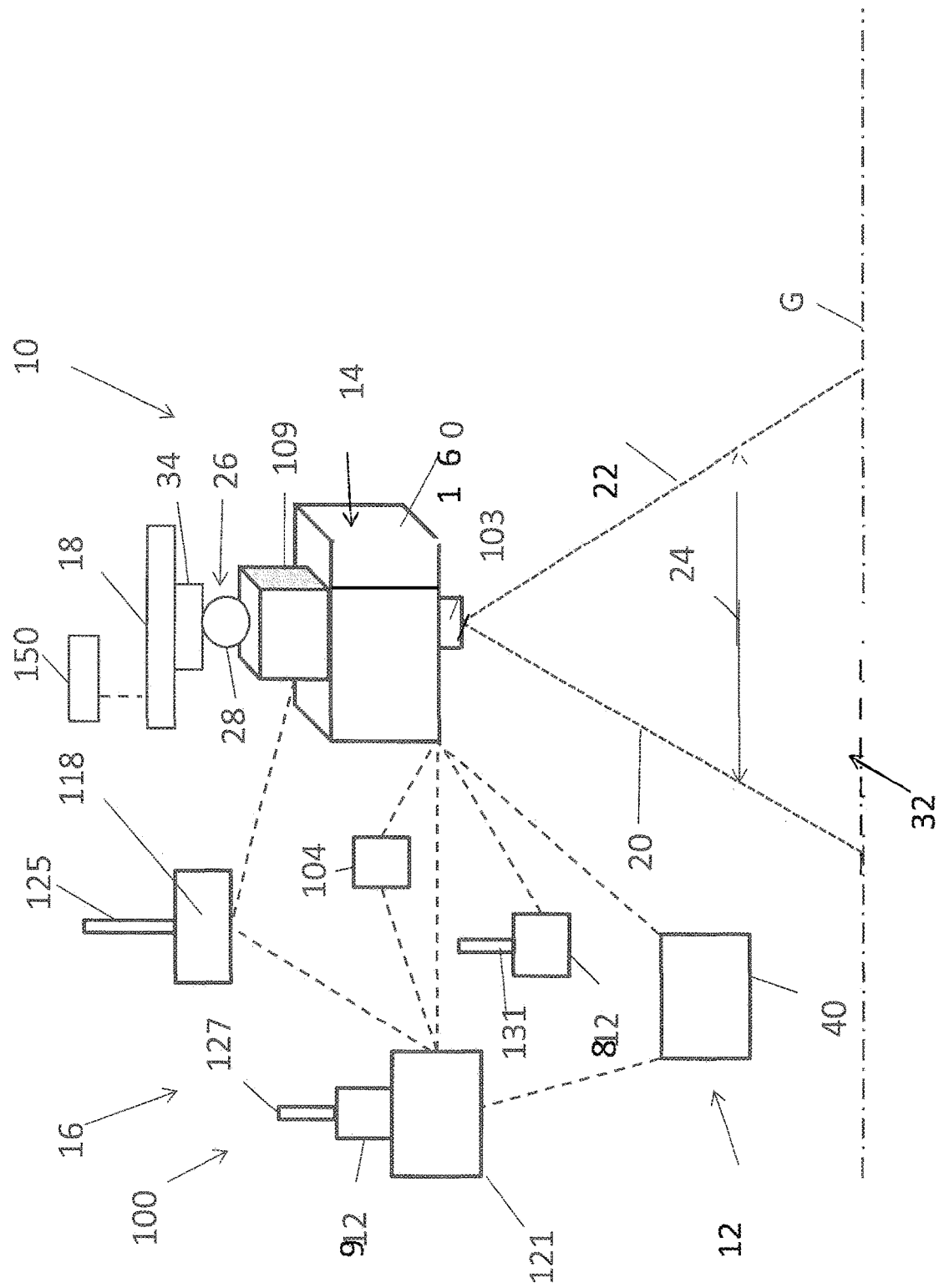
FIG. 1 is a schematic view of a measurement system of the present disclosure.

Referring to FIG. 1, a measurement system 10 includes a monitoring assembly 12 which may contain a computer and monitor (e.g., a ground station) for marking measurement points and computing the distances or scores and a vertical camera scoring assembly 100 which includes: an imaging assembly 14; a data transmitting assembly 16; a video transmitter 128 and antenna 131; a GNSS 118 and antenna 125; an aerial platform 18 with a propulsion device (e.g., rotors, propellers, etc.) to provide overhead images and telemetry data to monitoring assembly 12. In one illustrative embodiment, the propulsion device may comprise multiple rotors (e.g., quadrotors) operably coupled to the aerial platform 18. Exemplary aerial platforms are available from AerialPixels, SZ DJI Technology Co. Ltd. and from Parrot, and are described in U.S. Pat. No. 9,321,530 to Wang et al. and U.S. Pat. No. 8,474,761 to Callou, the disclosures of which are expressly incorporated herein by reference.

Any of the components of measurement system 10 may be powered by an on-board or a remote power supply 150, such as lithium polymer batteries, or may be powered by a wired connection (e.g., an electrical wire or cable) to a power source. Measurement system 10 is configured for overhead measurement of a coordinate or measurement area 32 on a ground surface G. In one embodiment, ground surface G may be any generally flat terrain on land or may be water. Measurement system 10 is configured to measure, detect, or otherwise determine a geodetic position of a stationary or moving object or target within coordinate area 32, a velocity of moving object or target within coordinate area 32, and/or a distance between an object within coordinate area 32 and the impact of a projectile or other object intended for the object ("miss distance"). Additionally, in one embodiment, measurement system 10 is configured to detect, measure, or otherwise determine a geodetic position of a virtual object, such as a spot on an ocean surface that is being targeted that lacks a physical real-world target.

Referring still to FIG. 1, in one embodiment, imaging assembly 14 includes a camera 106 with a lens 103, for capturing static and/or moving images (i.e., video). Illustratively, lens 103 may be a low-distortion rectilinear lens. Lens 103 is configured with a left-most line of sight 20 and a right-most line of sight 22 which defines a field-of-view (FOV) 24 of lens 103 such that camera 106 is configured to capture any moving or stationary objects on ground surface G within field-of-view (FOV) 24. The entire FOV 24 of camera 106 and lens 103 is comprised of a fore/aft dimension that, along with the left and right lines of sight 20, 22, can define a two-dimensional FOV area of camera 106 that intercepts ground surface G (e.g., land, water). Characteristics of the lens 103 define the FOV 24. Imaging assembly 14 also may include a distance measuring device, such as a laser rangefinder 104, operably coupled to camera 106 to detect, measure, or otherwise determine the distance from camera 106 to ground surface G. In one embodiment, distance measuring device is comprised of rangefinder 104, a laser rangefinder or LIDAR, an altimeter, or any other device configured for distance measurement between ground G and camera 106.

As shown in FIG. 1, imaging assembly 14 also includes an inertial measurement unit (IMU) 109 for determining the horizontal and/or vertical attitude (e.g., pitch, roll, yaw) of camera 106. More particularly, the position of camera 106 and, therefore lens 103, may be moved or adjusted based on data sensed, measured, or otherwise determined by IMU 109. Imaging assembly 14 or any other assembly of measurement system 10 also may include a Global Navigation Satellite System (GNSS) 118 configured to detect or otherwise determine the geodetic coordinate or positions (e.g., longitude, latitude, and/or altitude) of camera 106. GNSS 118 may include an antenna 125 or other transmitting/receiving member for detecting global coordinates of camera 106 through satellite, cellular, or any other data transmissions. It should be appreciated that there may be an offset (x, y and/or z coordinates) between the GNSS 118 and the camera 106, thereby requiring a translation between GNSS position and camera position.

Referring still to FIG. 1, in one embodiment, IMU 109 is coupled to a support assembly 26 of measurement system 10. Illustratively, support assembly 26 may define a three-axis brushless gimbal configured to move camera 106 and rangefinder 104 in any of the x, y, and z axes. Movement of support assembly 26 may be electronically and/or automatically controlled through a gimbal control unit (GCU) 34. Support assembly 26 may include a plurality of movable devices 28, for example rotatable brushless motors, pulleys, or rotatable bearings. In one embodiment, support assembly 26 stabilizes camera 106 in a straight down position such that lens 103 is maintained in a plumb bob or nadir position to capture plan views of coordinate area 32.

As shown in FIG. 1, GCU 34 is coupled to moveable devices 28 and can be programmed in advance to maintain camera 106 and rangefinder 104 in a stable nadir position, instantaneously compensating for movement of aerial platform 18.

Once camera 106 captures a static or video image of coordinate area 32, images and other data (e.g., telemetry or position data) from camera 106, IMU 109, GNSS 118, and rangefinder 104 may be transmitted to data transmitting assembly 16. In one embodiment, data transmitting assembly 16 is hard-wired to imaging assembly 14, however, in an alternative embodiment, data transmitting assembly 16 may be wirelessly coupled to imaging assembly 14 through a cellular, Bluetooth®, Wi-Fi, satellite, or any other wireless connection. In certain illustrative embodiments, a data security system may be incorporated within data transmitting assembly 16 to protect data transmission. For example, an encryption protocol (such as Wired Equivalent Privacy (WEP2)) may be stored on a Wi-Fi 33 card coupled to a bus system that communicates between the camera 106 and the monitoring assembly 12.

As shown in FIG. 1, data transmitting assembly 16 includes a telemetry consolidation unit 121, a transmitter 129 operably coupled to telemetry consolidation unit 121, and an antenna 127 operably coupled to transmitter 129. Telemetry consolidation unit 121 is configured to receive and/or transmit data from/to imaging assembly 14 and monitoring assembly 12 such that the data obtained by imaging assembly 14 is transmitted to monitoring assembly 12, such as the images obtained by camera 106 and the distances obtained by rangefinder 104.

Figure 2:
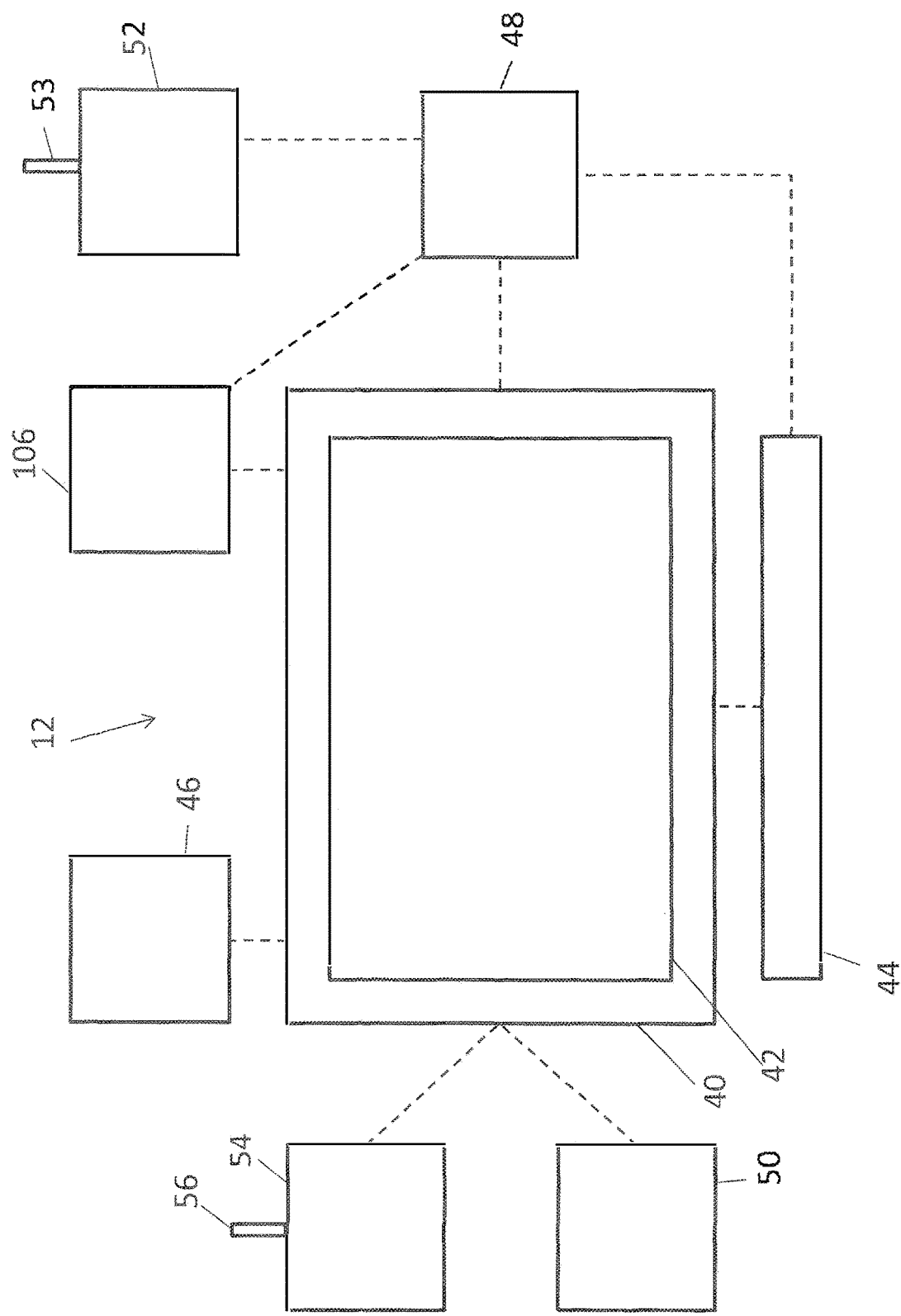
FIG. 2 is a schematic view of a monitoring assembly of the measurement system of FIG. 1.

Referring to FIG. 2, monitoring assembly 12 may be configured to both receive and transmit data from/to imaging assembly 14 through data transmitting assembly 16. In one embodiment, monitoring assembly 12 includes a computer 40 with a memory and a processor configured to execute machine-readable instructions. In one embodiment, computer 40 may be portable, such as a laptop or tablet-style device. Monitoring assembly 12 may define a ground station for measurement system 10 such that a user can control measurement system 10 from a remote location and compute measurements or scores from a location remote to aerial platform 18 and camera 106. Computer 40 includes a display or monitor 42 and at least one input device 44. For example, input device 44 may be an alphanumeric keyboard, a mouse, a joystick, stylus, or any other type of device configured to provide an input from a user to computer 40. Computer 40 is operably coupled to a power supply 46, for example a battery or external power source.

Computer 40 either includes or is operably coupled to a plurality of software modules such as scaling unit 48 and a scoring unit 50. Additionally, computer 40 is operably coupled to camera 106 of imaging assembly 14. Because camera 106 has both video and static imaging capabilities, camera 106 may include or be operably coupled to a video receiver 52 of imaging assembly 14 which includes an antenna 53. Because camera 106 has video capabilities, the user may use video commands, such as pause, play, fast-forward, reverse, and slow-motion to watch any portion of the video obtained from camera 106. Additionally, camera 106 and video receiver 52 may be operably coupled to scaling unit 48. Computer 40 also may be coupled to a telemetry data receiver 54 of data transmitting assembly 16 which includes an antenna 56. In one embodiment, video receiver 52 and video antenna 53 are operably coupled to a video transmitter 128 and video antenna 131 and/or monitoring assembly 12. Additionally, telemetry data receiver 54 and antenna 56 are operably coupled to monitoring assembly 12 and imaging assembly 14.

Figure 3A:
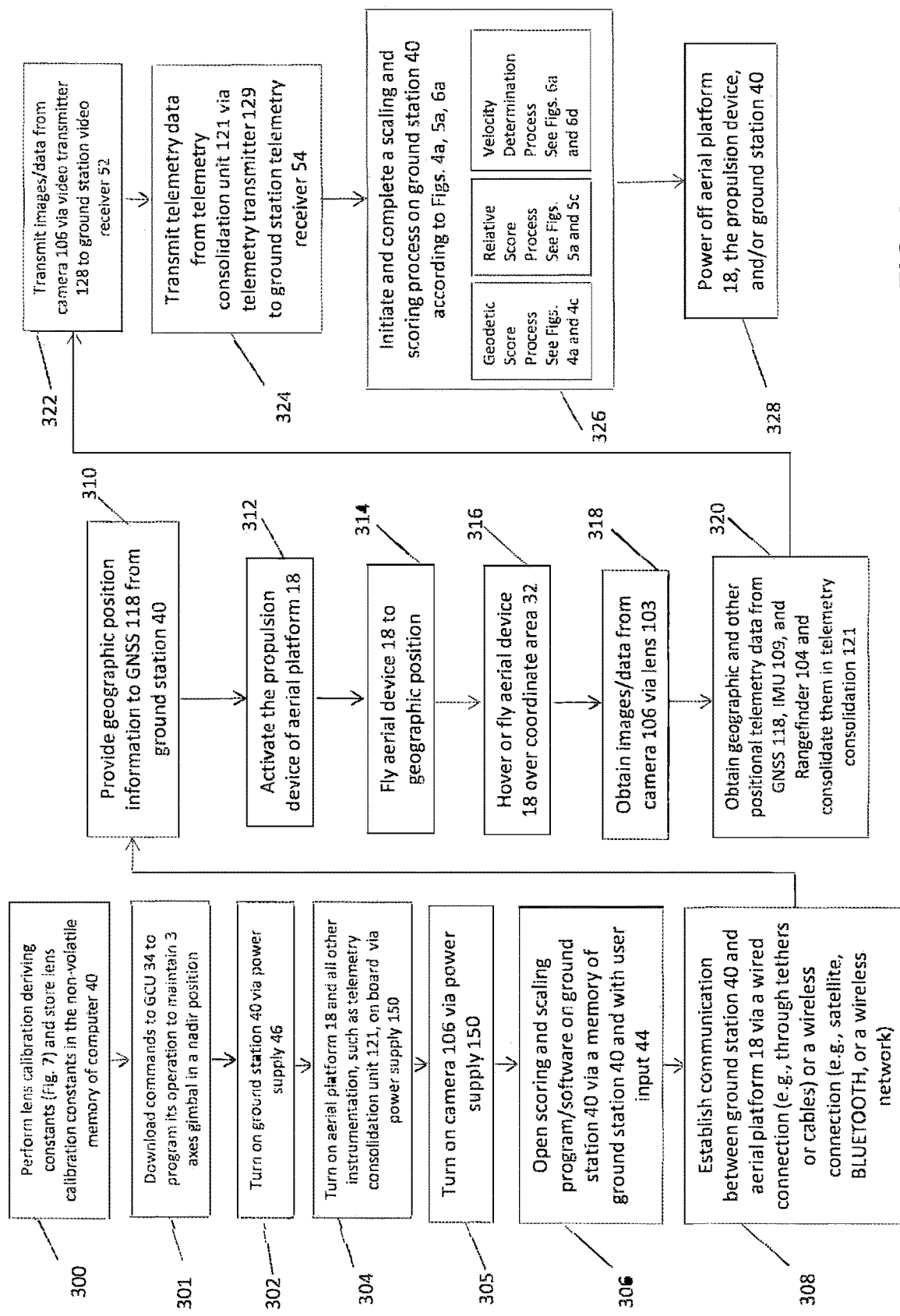
FIG. 3a is an operational flow chart for an aerial platform of the present disclosure.
Figure 3B:
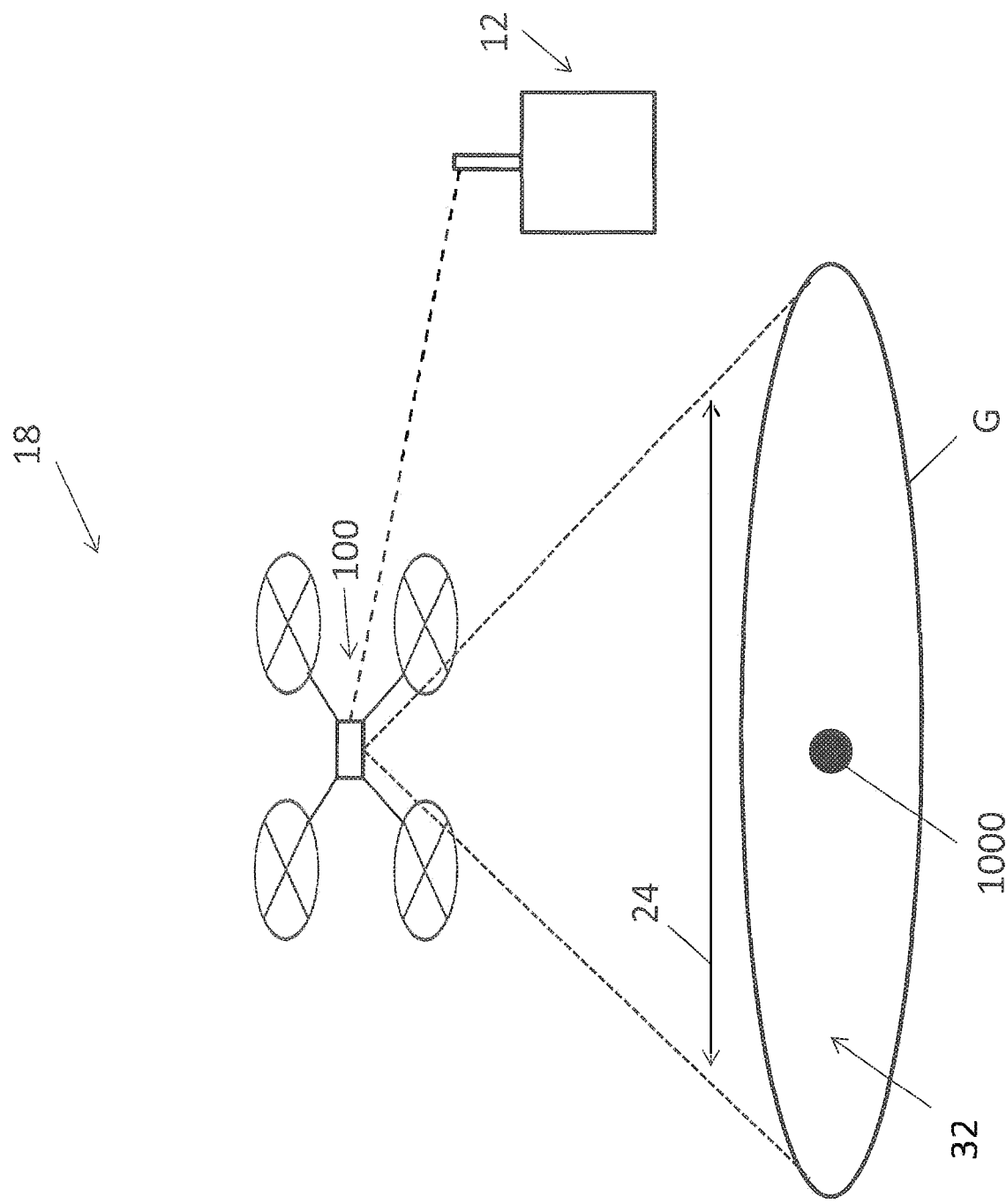
FIG. 3b is a schematic view of an aerial platform of the measurement system of FIG. 1 and operably coupled to the monitoring assembly of FIG. 2 when determining a measurement of a target within a measurement or coordinate area.

Referring to FIGS. 3a and 3b, in operation, measurement system 10 may be used to determine the geodetic position of a static target or location within a particular area and also may be used to determine a miss distance of an impact of a projectile away from a target and/or to determine the velocity of a moving object or target within a particular area. More particularly, at least camera 106 of imaging assembly 14 is coupled to aerial platform 18. Illustratively, aerial platform 18 is any type of device configured to fly or hover above ground surface G. For example, aerial platform 18 may be any unmanned aerial vehicle ("UAV") or device, such a drone or remote-controlled airplane, helicopter, or other similar device configured to be remotely operated. Alternatively, aerial platform 18 may be a manually-controlled aerial vehicle or a static structure, such as a bridge or tower. Aerial platform 18 may be powered by lithium polymer batteries. In one embodiment, GNSS 118 and the propulsion system for aerial device 18 cooperate to define a position maintenance system for maintaining the position of aerial device 18 during a stationary hover. For example, GNSS 118 can determine if the position of aerial device 18 is shifting/drifting, and because GNSS 118 and the propulsion system are hard-wired to aerial device 18, GNSS 118 and the propulsion system work together through hard-wired communication to maintain the position of aerial device 18.

As aerial platform 18 flies or hovers or moves over a particular area, coordinate area 32 may be defined on ground surface G by FOV 24 of lens 103. In one embodiment, aerial platform 18 is configured to hover over coordinate area 32 at a location which contains a target 1000 therein which may be moving or stationary. As shown in FIG. 3, target 1000 may be a virtual target at a geodetic longitudinal and latitudinal positon. Camera 106 is configured to capture live static or video images of the stationary or moving object and transmit images via video transmitter 128 and video antenna 131 and data (e.g., time tags, coordinate information, etc.) to monitoring assembly 12 where it is received by video receiver 52 and antenna 53. For example, data such as the position of camera 106 may be obtained from GNSS 118 and/or IMU 109 and transmitted through data transmitting assembly 16 to monitoring assembly 12. Data regarding the image time stamp of each frame of the video can be similarly transmitted to monitoring assembly 12. Data from rangefinder 104 also may be transmitted to monitoring assembly 12 through data transmitting assembly 16. Data from GNSS 118, IMU 109, and Rangefinder 104 will provide a continuous plurality of measurements with time tag associations at an update rate corresponding to or greater than the frame rate of to the video or static images. With this data, monitoring assembly 12 may employ scaling unit 48 and/or scoring unit 50 to provide images, text, or any other type of output to convey the information (e.g., geodetic point positions, distances, scores, velocities, and/or recorded video) being captured by measurement system 10 to a user.

FIG. 3a discloses an exemplary operational chart for operating aerial platform 18 from computer 40. For example, at a Step 300, lens calibration is performed to derive constants (see FIG. 7) and the lens calibration constants are stored in the non-volatile memory of ground station 40. In Step 301, GCU 34 is programmed to perform the movement and stabilization of camera 106 and rangefinder 104 via a 3 axes brushless gimbal in a nadir or straight down position at all times. Accordingly, the nadir position will be instantaneously adjusted for irrespective of roll, yaw, or pitch movements of aerial platform 18. At a Step 302, computer 40 may be turned on via a power supply 46, such as batteries. At a Step 304, aerial platform 18 also may be turned on via a power supply 150. At a Step 304, all on-board devices, such as telemetry consolidation unit 121, on aerial platform 18 may be turned on and will draw power from the power supply 150 powering aerial platform 18. In a Step 305, camera 106 is turned on via power supply 150.

In a Step 306, a user may open a scoring and/or scaling program or software from a memory of computer 40 using user input 44. In a Step 308, communication may be established between computer 40 and aerial platform 18, for example may be hard-wired through electrical wires, cables, or tethers or may be wirelessly connected through a radio frequency, satellite, BLUETOOTH, or other wireless network. In a Step 310, geographic coordinates, data, or positions may be provided to GNSS 118 from computer 40 to determine where aerial platform should fly to or hover over to capture images of coordinate area 32. In a Step 312, the propulsion system of aerial device 18 may be activated. In a Step 314, aerial platform 18 flies to the geographic location and, in a Step 316, hovers (moving or stationary) over coordinate area 32. In a Step 318, camera 106 obtains images of coordinate area 32. In a Step 320, the location of camera 106 may be obtained from GNSS 118. In a Step 322, the images and/or data from camera 106 are transmitted to video receiver 52 through a wireless connection on aerial platform 18. In a Step 324, data is transmitted from camera 106 to telemetry data receiver 54 via video transmitter 128 and from GNSS 118 to telemetry data receiver 54. In a Step 326, the scaling and scoring process is initiated on ground station 40 according to any of FIGS. 4a-4c, 5a-5c, and/or 6a-6d. In a Step 328, aerial platform 18, computer 40, and/or the propulsion device are powered off.

Figure 4A:
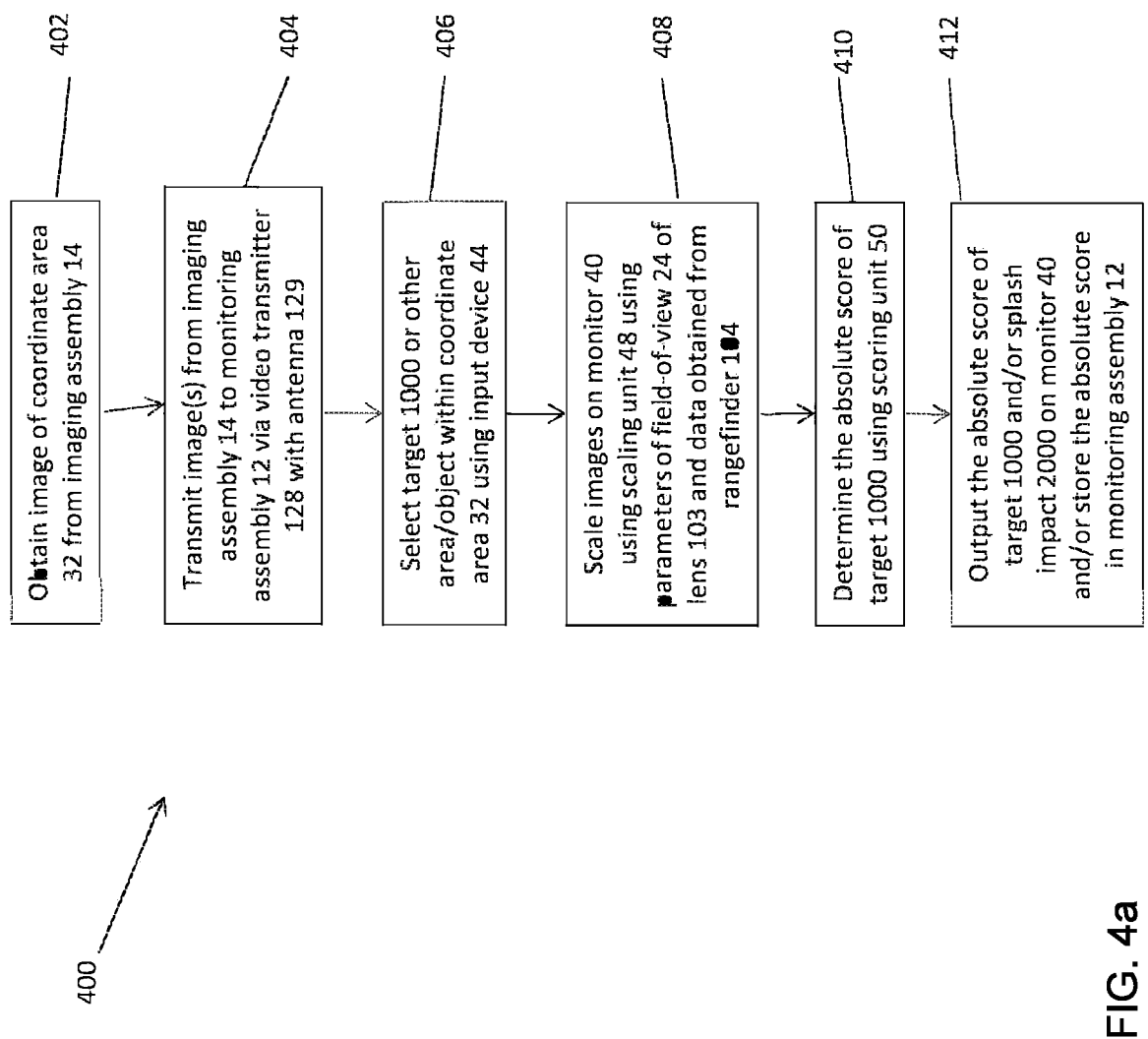
FIG. 4a is a flow chart illustrating the steps performed by the measurement system when measuring a parameter of a target within the coordinate area of FIG. 3b exemplifying derivation of absolute geodetic positions (e.g., latitude/ longitude)
Figure 4B:
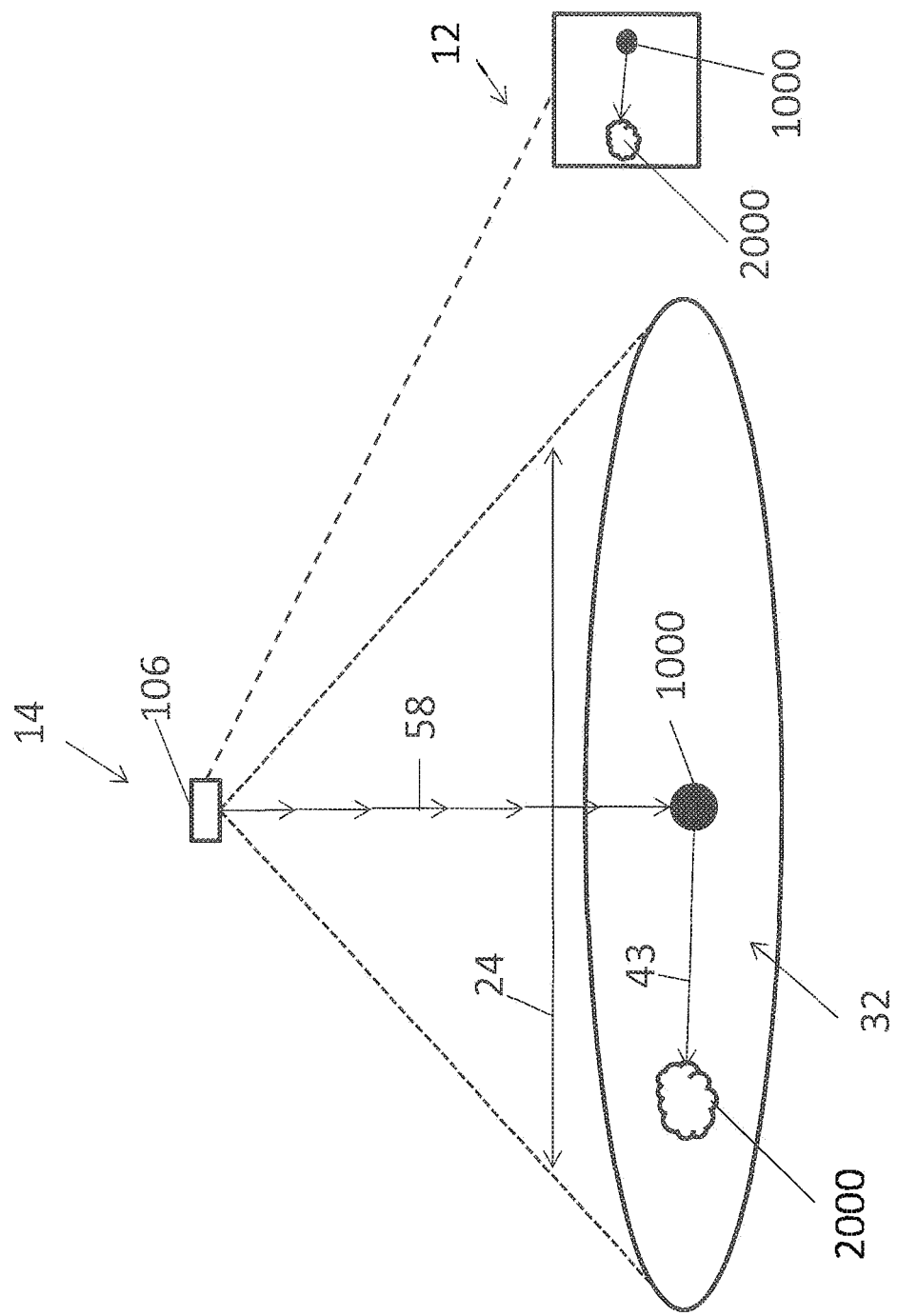
FIG. 4b is as schematic view of a camera of the measurement system of FIG. 1 taking a measurement of a stationary target and a point of impact of a projectile or other device that was intended for the target within the coordinate area exemplifying derivation of absolute geodetic positions (e.g., latitude/longitude)
Figure 4C:
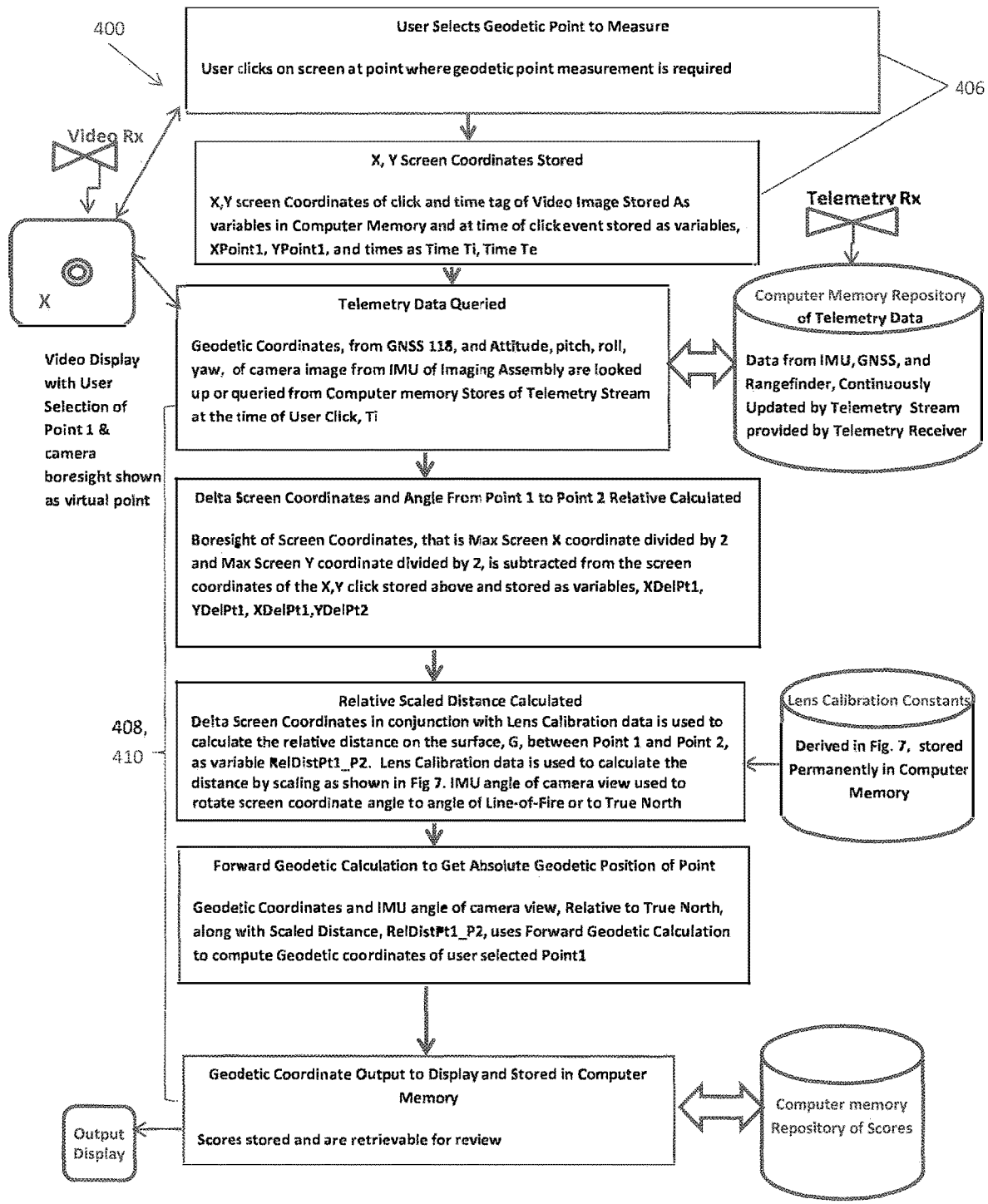
FIG. 4c is a further flow chart illustrating computer functions, memory constructs, and user interactions needed to generate an absolute geodetic score.

Referring to FIGS. 4a-4c, measurement system 10 is illustratively configured to operate according to an absolute scoring process 400 to determine an absolute score related to the geodetic position of a non-physical object, such as a virtual target 1000, within coordinate area 32. For example, a virtual target 1000 may be a geodetic latitudinal/longitudinal point upon ground surface G. More particularly, using monitoring assembly 12, a user is able to see coordinate area 32 through lens 103 of camera 106 which transmits live or real-time images of the current location of camera 106 and of coordinate area 32 in Step 402 of absolute scoring process 400. In Step 404, when the area around target 1000 is flown over by aerial platform 18 (e.g., coordinate area 32), the user sees coordinate area 32 on monitor 42 of computer 40 because the image(s) obtained by camera 106 are transmitted to computer 40 through video transmitter 128. For example, camera 106 may transmit images with video transmitter 128 and video antenna 131 which are received by video antenna 53 of video receiver 52 which allows images from camera 106 to be shown on monitor 42. Camera 106 is maintained in a nadir position through the three-axis gimbal with GCU 34. Telemetry data receiver 54 communicates with telemetry consolidation unit 121 to transmit data from IMU 109, GNSS 118, and/or rangefinder 104 to monitoring assembly 12.

More particularly, telemetry consolidation unit 121 contains microcontrollers to read and time tag the data from rangefinder 104, GNSS 118, and IMU 109 and consolidates such data into a single data stream. The consolidated data stream is then transmitted to monitoring assembly 12 via transmitter 129 and antenna 127. For example, data streams from rangefinder 104, GNSS 118, and IMU 109 are merged together by telemetry consolidation unit 121 with time and/or data stamps or tags for individual data samples and the time tags also can be synchronized to video data frames generated by camera 106. In one embodiment, a plan view of the images/video obtained from camera 106 are shown on monitor 42, however, in an alternative embodiment, three-dimensional images are shown on monitor 42.

Subsequently, in Step 406, using input device 44, the user moves a cursor or other indicator on monitor 42 over coordinate area 32 and clicks to select target 1000 during a "Get Cursor Position" step. Upon clicking or marking a point (e.g., a target 1000) within coordinate area 32, which may be a point of impact, a stationary object, or any other fixed location within coordinate area 32, the location of which is identified by geodetic coordinates within monitoring assembly 12. Illustratively, as shown in FIG. 4b, the geodetic latitudinal and longitudinal position of camera 105, as held in the nadir or plumb-bob position by support assembly 26, is the same geodetic latitudinal and longitudinal position as virtual target 1000, which lies directly underneath camera 106 and is depicted by vertical line or centerline/bore line of sight 58. Therefore, the location of virtual target 1000, as shown in FIG. 4b, may be the same as reported by GNSS 118. Additionally, an absolute score of a splash 2000, which is offset from virtual target 1000 in FOV 24 and coordinate area 32 may be determined.

In Step 406, the images/data shown on monitor 42 can be divided into a plurality of equal units. For example, in one embodiment, monitoring assembly 12 and/or data transmitting assembly 16 may be configured to divide or apportion the images and data shown on monitor 42 into 1000 or more equal units, each having a length extending along the x and y axes (i.e., the respective left/right and top/bottom directions of monitor 42). Input device 44 is moveable by the operator along the x and y axes to move a cursor or other indicator shown on monitor 42. This equal apportionment of x and y coordinates upon monitor 42 allows precise screen distances to be measured for later scaling. Whenever the operator clicks or otherwise provides an input to input device 44 to indicate a position upon the image shown on monitor 42, the position of the cursor or indicator along the x and y axes or the apportioned box or unit in which the user marked target 1000 is stored by monitoring assembly 12. Monitoring assembly 12 also provides an option to the operator to fast-forward, reverse, pause, slow down, or speed up any video obtained from camera 106 and shown on monitor 42. By allowing for these options with video data, the operator may accurately identify a point in coordinate area 32 by freezing the frame at a moment when the position is required, or in the case of a scoring impact of a large gun on water or land, which creates a splash or puff of smoke, the operator, for greater accuracy, could reverse the video back in time to the video frame that brings the splash/puff of smoke to a small point.

In Step 408, during the scaling procedure or a "Computer Score" step and a "Scale Video Computation" step, the images and/or video shown on computer 40 and obtained via video transmitter 128 and video antenna 131 from camera 106 may be scaled by using the x and y screen coordinates in conjunction with information about FOV 24 from lens 103. The exemplary video can be scaled by scaling unit 48. For example, scaling unit 48 may use predetermined and stored values of constants or parameters of FOV 24 of lens 103 and a distance from ground surface G as provided by rangefinder 104 to compute a size of FOV 24 at any given range determined by rangefinder 104. More particularly, scaling unit 48 is configured to apply a ratio of the distance between camera 106 and an object relative to the length or size of FOV 24 of lens 103 and, using that ratio which may be stored and predetermined from previous testing of camera 106 and knowing the distance between camera 106 and target 1000 (determined, for example, by rangefinder 104), scaling unit 48 is configured to determine the size of FOV 24 so the operator understands the distances and parameters shown on monitor 42. For example, the screen distance from virtual target 1000 to splash 2000 can be determined from the x and y screen coordinates that an operator may mark with respect to the x and y coordinates of virtual target 1000. The x and y screen coordinates of virtual target 1000 correspond to the exact center of a video image displayed on display 42 because that is the boresight of the video image. An actual distance between virtual target 1000 and splash 2000 is represented by vector 43 in FIG. 4b. The distance of vector 43 may be computed as a ratio of FOV 24 at a given range by rangefinder 104 to the screen distance of vector 43. Vector 43 is the offset vector from the boresight of camera 106 which is computed with forward geodetic computation.

In Step 410, and using scoring unit 50 of monitoring assembly 12, an absolute score is determined which identifies an absolute geodetic location of an impact point or a geodetic point, splash 2000, or offset from virtual target 1000 within coordinate area 32. The absolute score of virtual target 1000 is computed using the latitudinal and longitudinal positions (geodetic position) and north bearing of the image of camera 106, as determined by GNSS 118 and/or IMU 109, respectively, which, therefore, identifies the coordinates and geodetic position of camera 106. More particularly, using the scaled distances of vector 43 and derived angle of vector 43, as gleaned from GNSS 118 and IMU 109, an absolute geodetic location of splash 2000 is calculated using forward geodetic calculations. The absolute score of target 1000 identifies distances and/or the angular offset of splash 2000 relative to virtual target 1000 and/or any other object. In this way, the absolute score calculates the geodetic position of splash 2000 which may be displayed on monitor 42. Moreover, a virtual target such as virtual target 1000 does not necessarily have to be positioned directly boresight beneath camera 106 as illustrated in FIG. 4b. Those skilled in the art will realize that further combinations of the steps outlined above may be used with the forward and inverse geodetic calculations to compute the coordinates of splash 2000 relative to a target offset from centerline position 58 of target 1000, as illustrated in FIG. 4b.

In Step 412, the absolute score of target 1000 is provided to monitor 42 for the operator to review the output of Step 410. More particularly, using scoring unit 50, data is transmitted to monitor 42 to provide a graphical, textual, pictorial, or any other visual output to the operator to understand the geodetic positions of target 1000 and splash 2000. The absolute score of target 1000, as well as the data received from imaging assembly 14 to calculate the absolute score using scoring unit 50, may be saved on monitoring assembly 12 for future review or reference, to assist with subsequent calculations or comparisons of data obtained by camera 106, etc.

Also in process 400, the IMU's angular yaw orientation data is already used to compute absolute latitude/longitude with the forward computation. All data during the "Compute Score" step is taken at the time of impact. Further, during the "Scale Video Computation" step, distance offsets from latitude and longitude of aerial platform 18 are obtained as projected on ground surface G to impact point using rangefinder 104 and lens 103 stored FOV 24 constants to determine FOV 24 span at ground surface G. All data during the "Scale Video Computation" step is taken at the time of impact.

Moreover, FIG. 4c illustratively details a computer pseudocode of the functions, memory constructs, flow of code, and user interaction through input 44 that computer 40 would execute at ground station 12 to generate an absolute geodetic measurement or score.

Figure 5A:
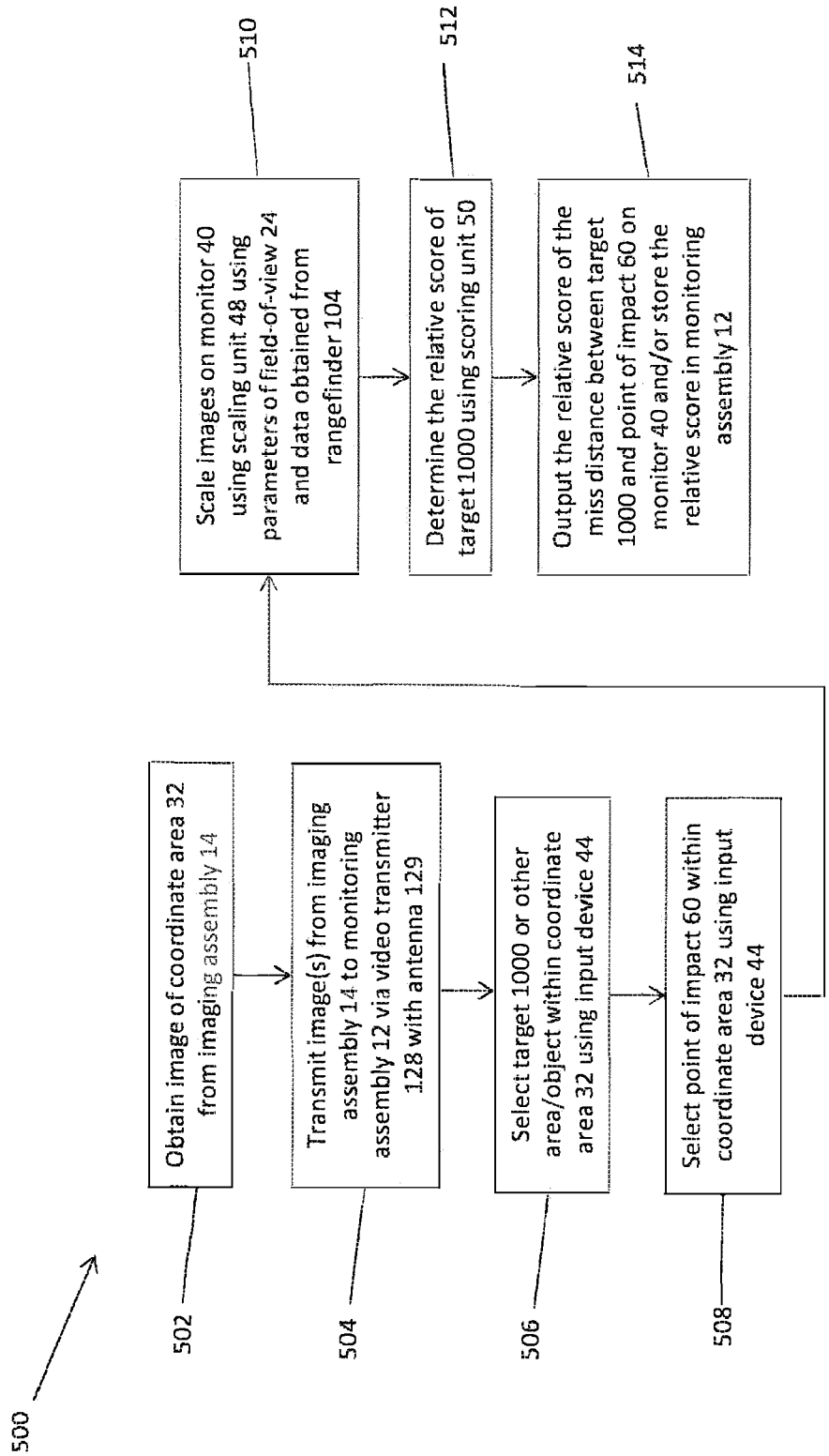
FIG. 5a is a flow chart illustrating the steps performed by the measurement system when measuring a miss distance between a target within the coordinate area and the point of impact of a projectile or other device that was intended for the target.
Figure 5B:
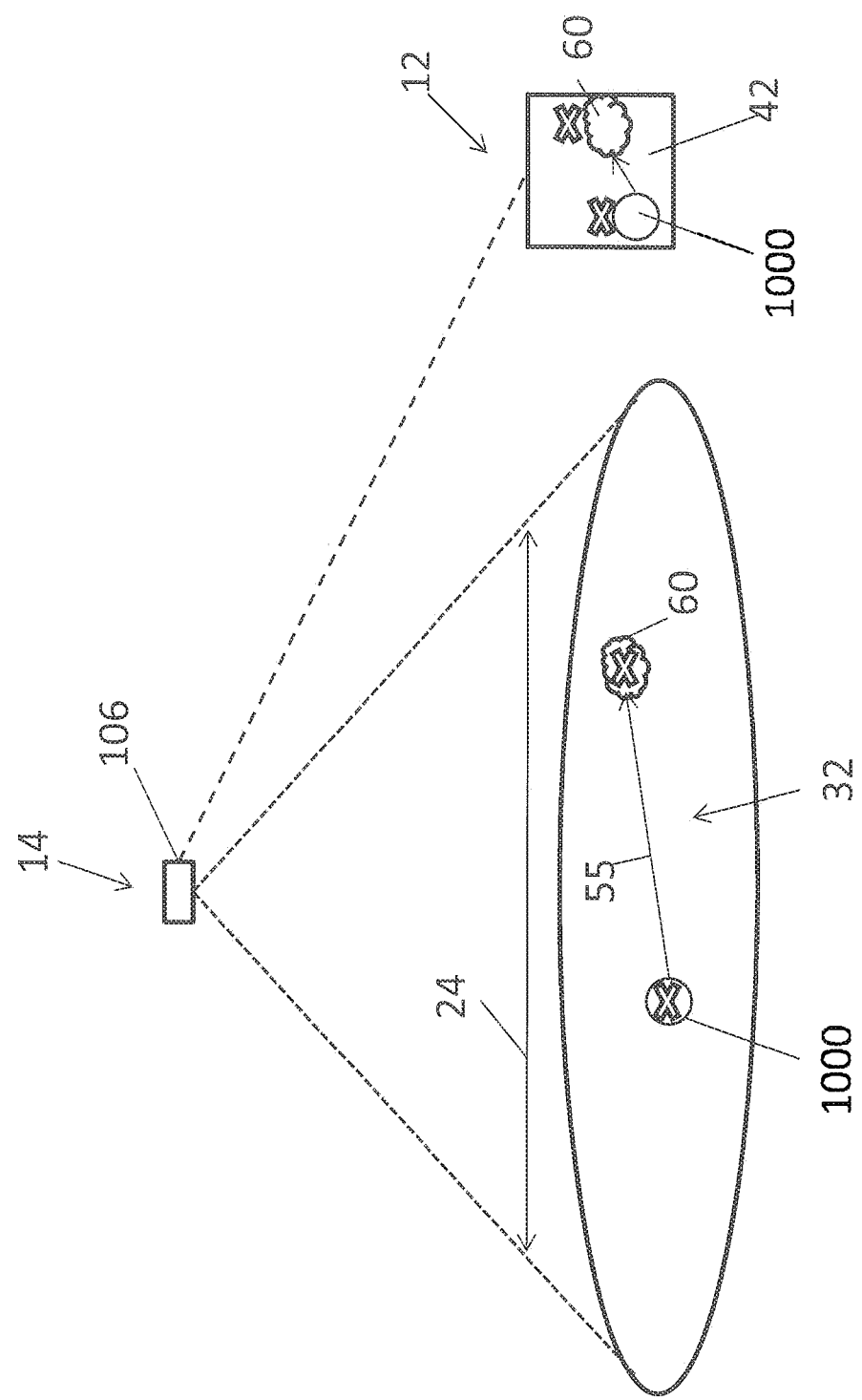
FIG. 5b is a schematic view of the camera of the measurement system of FIG. 1 taking a measurement of the miss distance within the coordinate area.
Figure 5C:
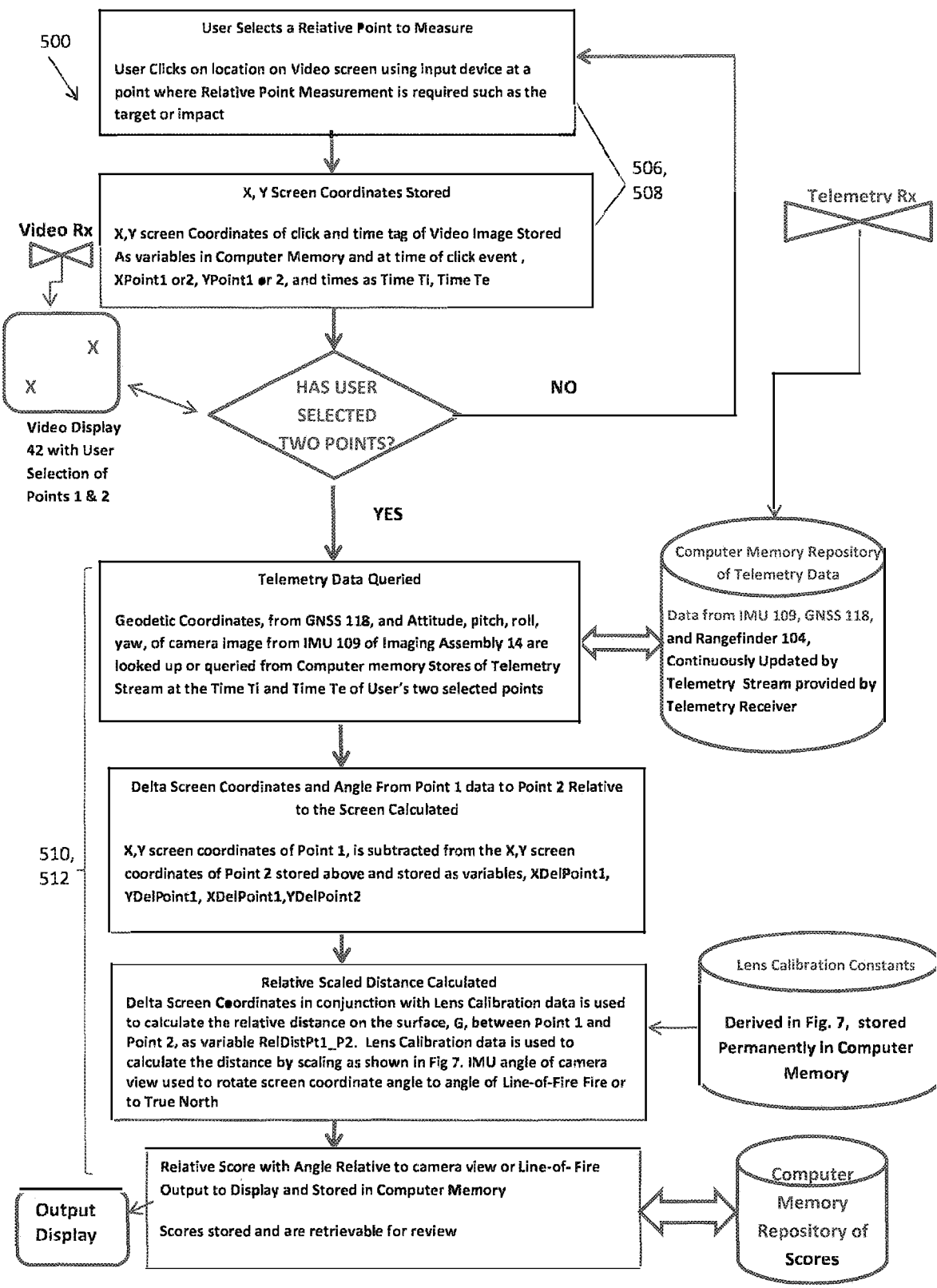
FIG. 5c is a further flow chart illustrating computer functions, memory constructs, and user interactions needed to generate a relative distance measurement or score.

Alternatively, as shown in FIGS. 5a-5c, measurement system 10 is configured to operate according to a relative scoring process 500 to determine a relative score related to the miss distance within coordinate area 32 between the position of an object, such as target 1000, and the position of a point of impact of projectile, ammunition, weapon, or any other device intended to contact target 1000.

First, in Step 502, using monitoring assembly 12, the operator is able to see coordinate area 32 through lens 103 of camera 106 which transmits live images of the current location of camera 106 and of coordinate area 32. In Step 504, when target 1000 is shown in coordinate area 32, the operator sees target 1000 on monitor 42 of computer 40 because the image(s) obtained by camera 106 are transmitted to computer 40 through video transmitter 128 and video antenna 131. For example, camera 106 may transmit images which are received by antenna 53 of video receiver 52 and video receiver 52 communicates with video transmitter 128 to transmit the images or data from camera 106 to video receiver 52 through antenna 53. Telemetry data receiver 54 communicates through antenna 56 with telemetry consolidation unit 121 to transmit data from IMU 109, GNSS 118, and/or rangefinder 104 to monitoring assembly 12 through data transmitting assembly 16.

More particularly, telemetry consolidation unit 121 contains microcontrollers to read and time tag the data from the rangefinder 104, GNSS 118, and IMU 109 and consolidates such data into a single data stream. The consolidated data stream is then transmitted to monitoring assembly 12 via transmitter 129 and antenna 127. For example, data streams from rangefinder 104, GNSS 118, and IMU 109 are merged together by telemetry consolidation unit 121 with time and/or data stamps or tags for individual data samples and the time tags also can be synchronized to video data frames generated by camera 106. In one embodiment, a plan view of the images/video obtained from camera 106 are shown on monitor 42, however, in an alternative embodiment, three-dimensional images are shown on monitor 42.

In Step 506, once target 1000 is identified on monitor 42, the operator, using input device 44, initiates a "Get Cursor Position" step by moving a cursor or other indicator on monitor 42 to target 1000 which identifies target 1000. The operator may click on target 1000 to initiate relative scoring process 500, and computer 40 records the cursor positions of both target 1000 and point of impact 60, as disclosed herein. Upon clicking or otherwise marking or identifying target 1000, an indicator, such as an "X," may be visually shown on monitor 42.

Either prior to or after Step 506, and using input device 44, the operator moves the cursor or other indicator on monitor 42 to a splash or puff of smoke or dirt which identifies a point of impact 60 in Step 508. More particularly, upon clicking or marking point of impact 60, an indicator, such as an "X," may be visually shown on monitor 42 so that user can see point of impact 60.

Figure 7:
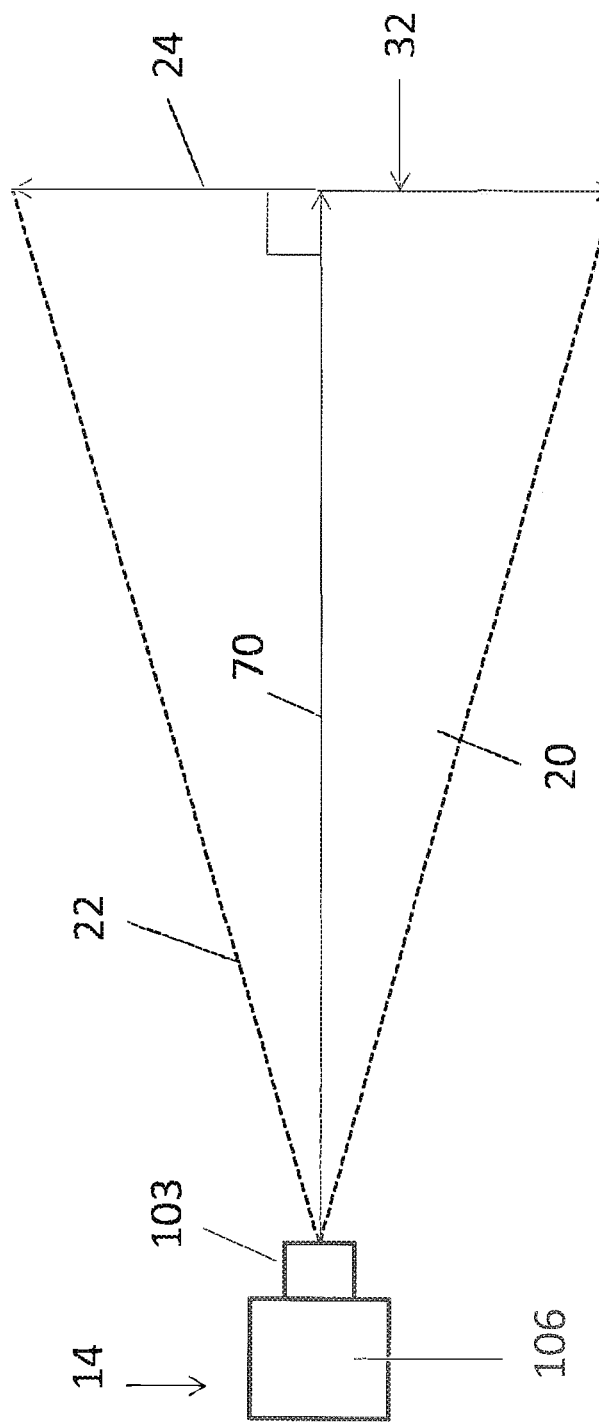
FIG. 7 is a schematic view of a camera lens of the camera of the measurement system of FIG. 1 undergoing a calibration process.

Referring to Step 510, a "Compute Score" step, the images and/or video shown on computer 40 and obtained from camera 106 via data transmitting assembly 16 may be scaled so the operator at monitor 42 understands the relative distances and locations of any object(s) within coordinate area 32. The exemplary video can be scaled by scaling unit 48 in "Scale Video Computation" step. For example, scaling unit 48 may use predetermined and stored values of constants or parameters of FOV 24 of lens 103 and a distance from ground surface G as provided by rangefinder 104 (FIG. 1) to compute a size of FOV 24 at any given range determined by rangefinder 104. This scaling procedure of the distance upon the screen, i.e., the difference in the x and y screen coordinates between target 1000 and splash 2000 and the scaling of FOV 24 of camera 106 equipped with lens 103, as detailed below in FIG. 7, is the substantially the same as described above for FIGS. 4a and 4b.

In Step 512, and using scoring unit 50 of monitoring assembly 12, a relative score is determined which identifies the location of target 1000 and the location of point of impact 60 within coordinate area 32 relative to each other. Using the scaled distances determined in Step 510, a distance between target 1000 and point of impact 60 is calculated or otherwise determined by scoring unit 50. In this way, the miss distance between target 1000 and point of impact 60 is displayed on monitor 42 which provides the operator with information to understand how and where the equipment, projectile, ammunition, or other device missed hitting target 1000. As shown in FIG. 5b, a vector drawn from target 1000 to impact 60 is shown as 55, that can represent the miss distance and the angle of impact miss from target 1000. Moreover, by using the angle of the video from camera 106, that may be found from data from IMU 109, the angle of vector 55, with respect to the line-of-fire, accounting for the alignment of camera 106, could be calculated and displayed on monitor 42. Vector 55 from target 1000 to point of impact 60 may be scaled during the "Scale Video" Computation" Step and the direction of vector 55 can be adjusted to absolute or true north if desired.

In Step 514, the miss distance between target 1000 and point of impact 60 is provided to monitor 42 for the operator to review the output of Step 512. More particularly, using scoring unit 50, data is transmitted to monitor 42 to provide a graphical, textual, pictorial, or any other visual output to the operator to understand the relative positions of target 1000 and point of impact 60 and the miss distance therebetween. The relative score of the miss distance between target 1000 and point of impact 60, as well as the data received from imaging assembly 14 to calculate the relative score using scoring unit 50, may be saved on monitoring assembly 12 for future review or reference, to assist with subsequent calculations or comparisons of data obtained by camera 106, etc.

Moreover, FIG. 5c illustratively details a computer pseudocode of the functions, memory constructs, flow of code, and user interaction through input 44 that computer 40 would execute at ground station 12 to generate a relative distance measurement or score.

Figure 6A:
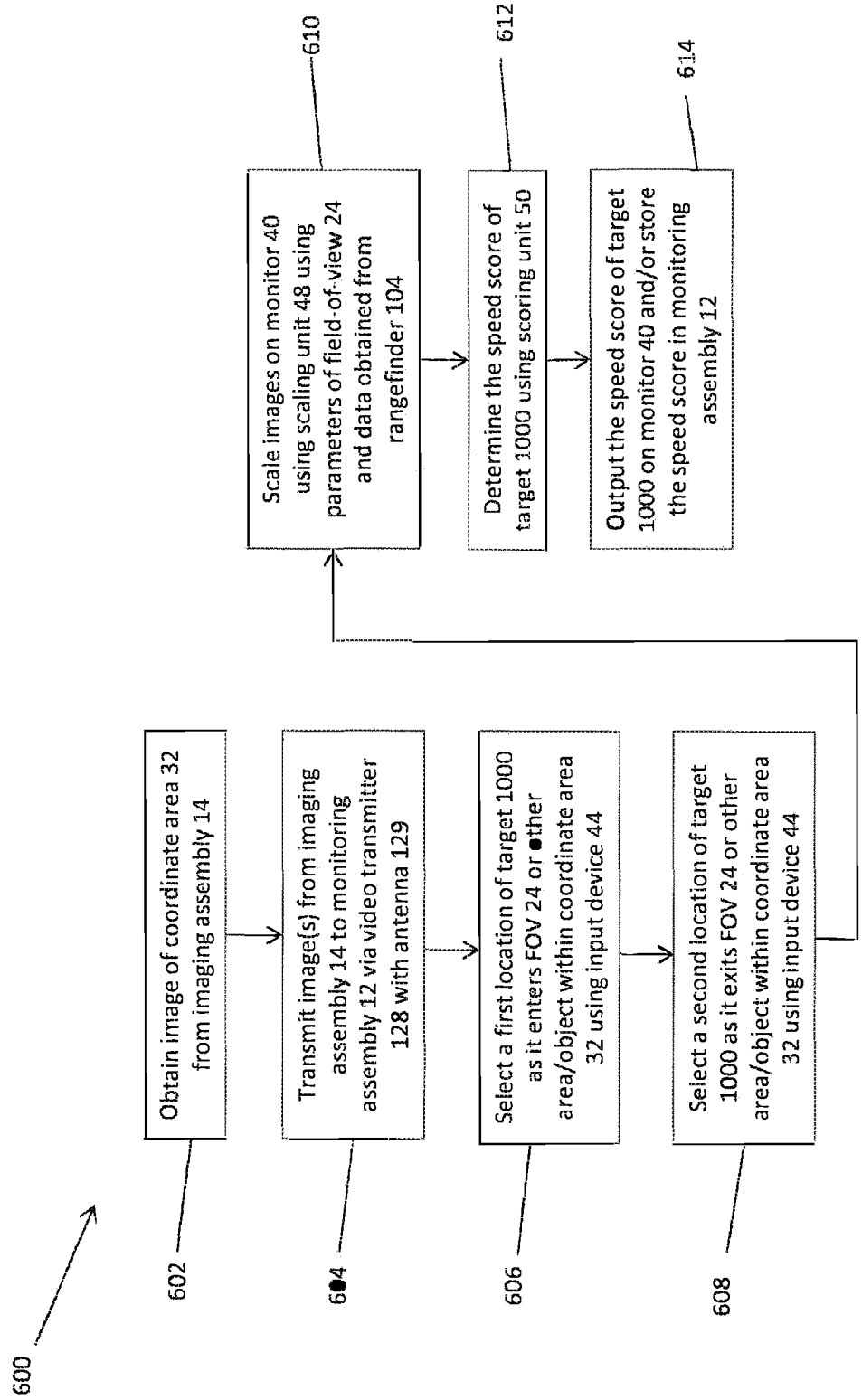
FIG. 6a is as flow chart illustrating the steps performed by the measurement system when measuring the velocity of a moving object within the coordinate area.
Figure 6B:
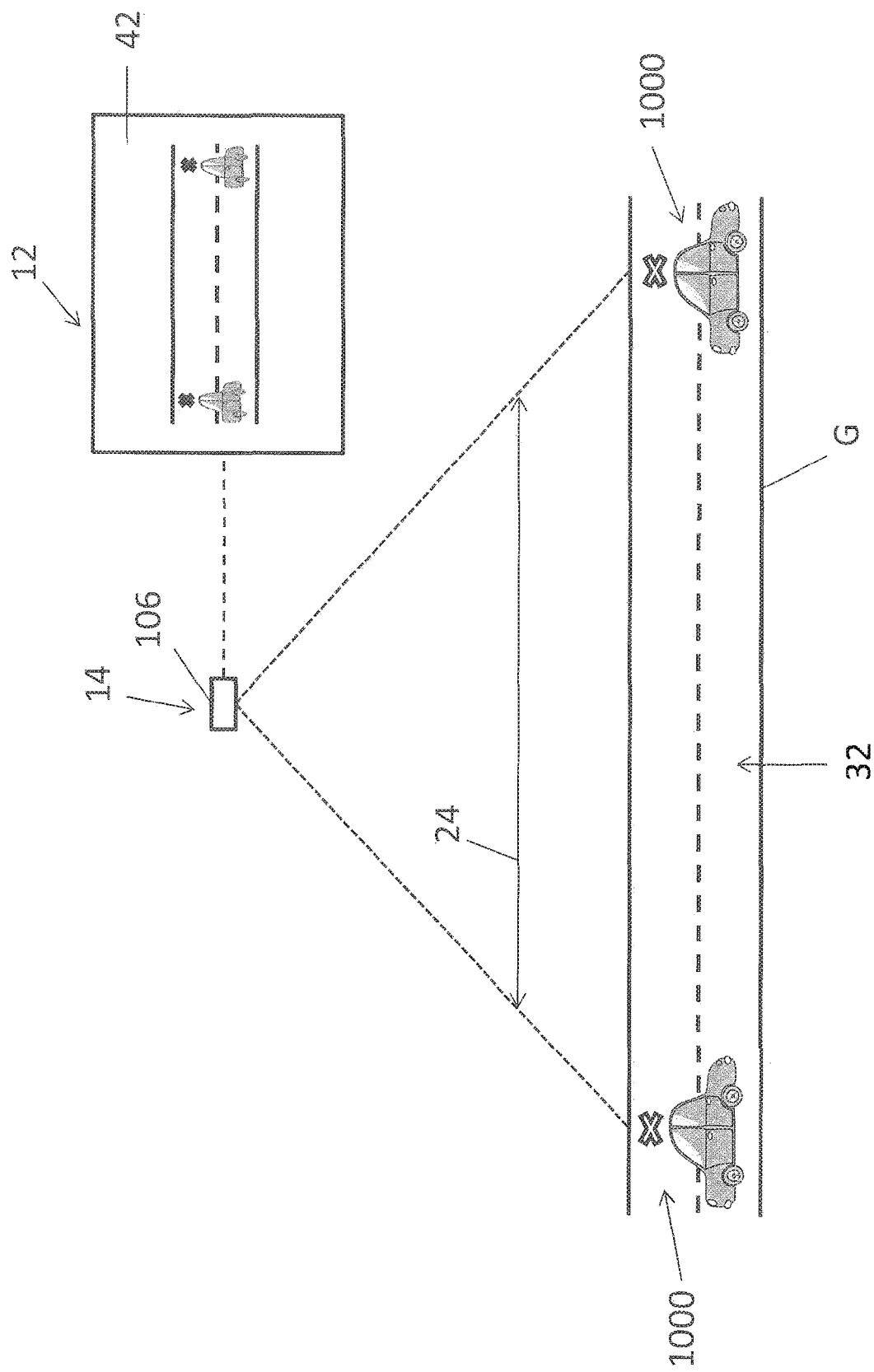
FIG. 6b is a schematic view of the camera of the measurement g system of FIG. 1 taking a measurement of the velocity of the moving object within the coordinate area.
Figure 6C:
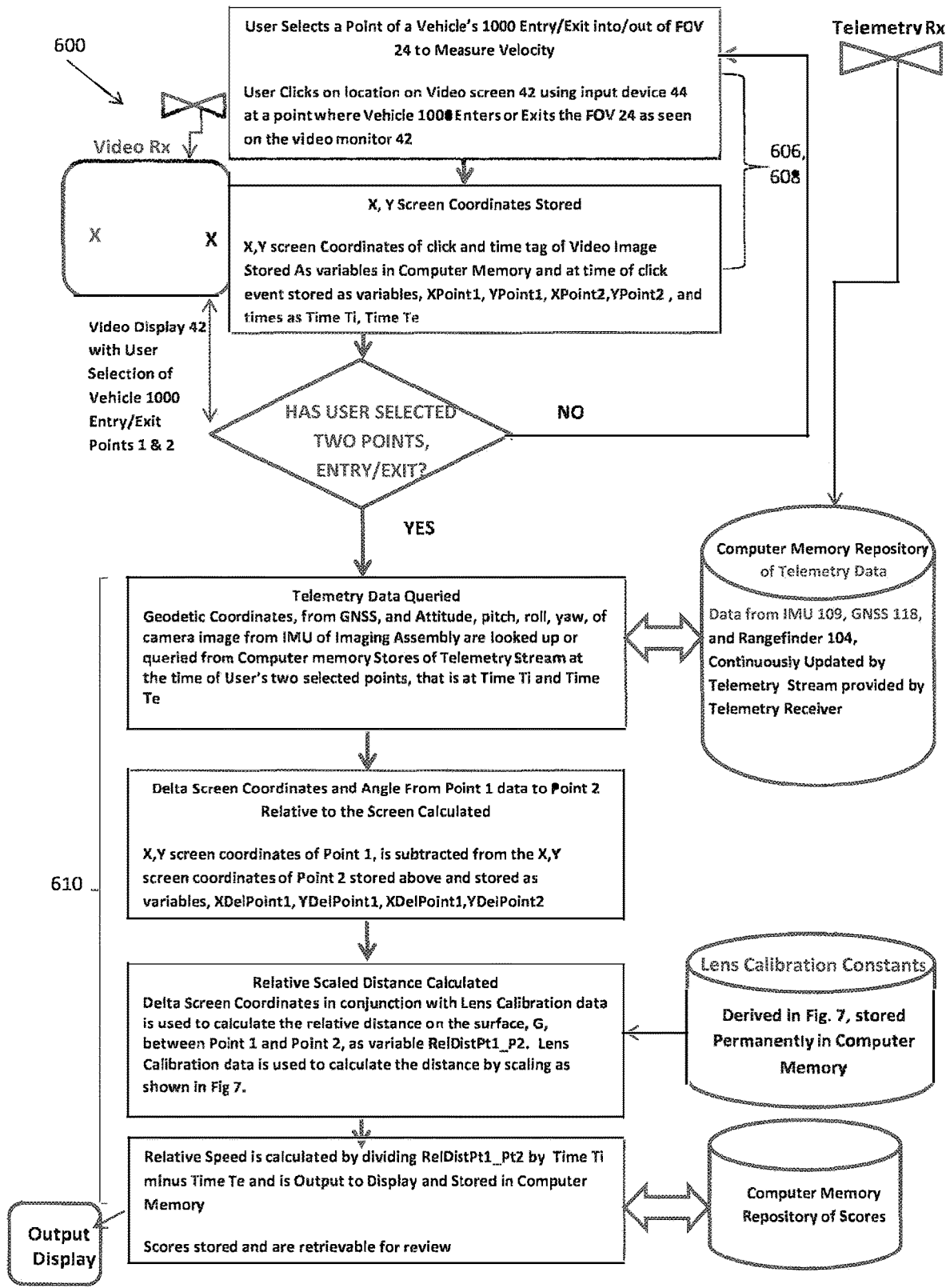
FIG. 6c is a further flow chart illustrating computer functions, memory constructs, and user interactions needed to generate a velocity determination.

In a further embodiment, as shown in FIGS. 6a-6c, measurement system 10 is configured to operate according to a speed scoring process 600 to determine a velocity or speed of an object, such as target 1000, moving within/across coordinate area 32.

First, in Step 602, using monitoring assembly 12, the operator is able to see coordinate area 32 through lens 103 of camera 106 which transmits live images of the current location of camera 106 and of coordinate area 32. In Step 604, when target 1000 is shown in coordinate area 32, the operator sees target 1000 on monitor 42 of computer 40 because the image(s) obtained by camera 106 are transmitted to computer 40 through video transmitter 128 and video antenna 131. For example, camera 106 and aerial platform 18 hover steadily when speed scoring process 600 is initiated in order to transmit images of coordinate area 32 which are received by antenna 53 of video receiver 52 and video receiver 52 communicates with video transmitter 128 to transmit the images or data from camera 106 to video receiver 52 through antenna 53 which allows images from camera 106 to be shown on monitor 42. Telemetry data receiver 54 communicates with telemetry consolidation unit 121 to transmit data from IMU 109, GNSS 118, and/or rangefinder 104 to monitoring assembly 12.

More particularly, telemetry consolidation unit 121 contains microcontrollers to read and time tag the data from rangefinder 104, GNSS 118, and IMU 109 and consolidates such data into a single data stream. The consolidated data stream is then transmitted to monitoring assembly 12 via transmitter 129 and antenna 127. For example, data streams from rangefinder 104, GNSS 118, and IMU 109 are merged together by telemetry consolidation unit 121 with time and/or data stamps or tags for individual data samples and the time tags also can be synchronized to video data frames generated by camera 106. In one embodiment, a plan view of the images/video obtained from camera 106 are shown on monitor 42, however, in an alternative embodiment, three-dimensional images are shown on monitor 42.

In Step 606, once target 1000 is identified on monitor 42, the operator during a "Get Cursor Position" step, using input device 44, moves a cursor or other indicator on monitor 42 to target 1000 which identifies target 1000 just as target 1000 enters coordinate area 32 at a time Ti. For example, if target 1000 is a moving vehicle, the operator watches coordinate area 32 and/or a surrounding area captured by camera 106 and identifies target 1000 at a certain point (e.g., a line or other identifier within coordinate area 32). The operator may click on target 1000 to initiate speed scoring process 600. Upon clicking or otherwise marking or identifying target 1000, an indicator, such as an "X," may be visually shown on monitor 42.

After Step 606, and using input device 44 in Step 608, the operator moves the cursor or other indicator on monitor 42 to the location of target 1000 when target 1000 leaves coordinate area 32 at a time Te. More particularly, upon clicking or marking the point when target 1000 leaves coordinate area 32, an indicator, such as an "X," may be visually shown on monitor 42 so that user can see both the point of entry and the point of exit for target 1000.

Referring to Step 610, the images and/or video shown on computer 40 and obtained from video transmitter 128 via camera 106 may be scaled so the operator at monitor 42 understands the relative distances and locations of any object(s) within coordinate area 32 during a "Computer Score Distance" step and a "Scale Video Computation" step. The exemplary video can be scaled by scaling unit 48. For example, scaling unit 48 may use predetermined and stored values of constants or parameters of FOV 24 of lens 103 and a distance from ground surface G as provided by rangefinder 104 (FIG. 1) to compute a size of FOV 24 at any given range determined by rangefinder 104. This scaling procedure of the distance upon the screen, i.e., the difference in the x and y screen coordinates as it enters and exits FOV 24 of camera 106 and the scaling of FOV 24 of camera 106 equipped with lens 103, as detailed below in FIG. 7, is the substantially the same as described above for FIGS. 4a and 4b.

In Step 612, and using scoring unit 50 of monitoring assembly 12, a relative score is determined which identifies the velocity of target 1000 within coordinate area 32. Using the scaled distances determined in Step 610, the distance travelled by target 1000 within coordinate area 32 is calculated or otherwise determined by scoring unit 50. Additionally, scoring unit 50 uses time stamp data to calculate the length of time it took target 1000 to travel the calculated distance within coordinate area 32. In this way, using the standard equation of velocity=distance/time, the velocity of target 1000 is calculated.

In Step 614, the velocity of target 1000 is provided to monitor 42 for the operator to review the output of Step 612. More particularly, using scoring unit 50, data is transmitted to monitor 42 to provide a graphical, textual, pictorial, or any other visual output to the operator to understand the velocity of target 1000 within coordinate area 32. The speed score of target 1000, as well as the data received from imaging assembly 14 to calculate the speed score using scoring unit 50, may be saved on monitoring assembly 12 for future review or reference, to assist with subsequent calculations or comparisons of data obtained by camera 106, etc.

Moreover, FIG. 6c illustratively details a computer pseudocode of the functions, memory constructs, flow of code, and user interaction through input 44 that computer 40 would execute at ground station 12 to generate a velocity determination.

Referring to FIG. 7, a derivation of lens calibration constants needed for scoring processes 400, 500, 600 are shown. For example, lens calibration constants may be a width of FOV 24 and a given distance 70 to camera 106. As shown in FIG. 7, FOV 24 may project vertically downward, as shown in FIG. 1, or project horizontally, as shown in FIG. 7, depending on the orientation of camera 106. Regardless of the orientation of lens 103 and camera 106, in one embodiment, centerline or bore line of sight 58 of lens 103 is configured to intersect coordinate area 32 at a 90-degree angle in a surveyed area of coordinate area 32. FOV 24, for example, could be set against a perfectly straight concrete wall in order to make as geometrically perfect measurement of FOV 24 as practicable. Distance 70 between lens 103 and coordinate area 32 and the parameters of FOV 24, including left-most and right-most lines of sight 20, 22, may be stored within monitoring assembly 12 for use during scoring processes 400, 500, 600. The various embodiments disclosed herein include lens 103 which is of a rectilinear type providing a linear scaling when conjoined with camera 106 with digital imaging capability. However, if lens 103 is not entirely linear, a compensatory curve fit to the non-linearity of lens 103 could be derived from the lens calibration range depicted in FIG. 7 by scoring/measuring regularly and surveyed spaced visual targets, within the video image, along FOV 24.

Additionally, a ratio of distance derived from rangefinder 104 to distance 70 allows computation of FOV 24 of camera 106 at a distance value provided by rangefinder 104 at a score time. For example, to calibrate lens 103, camera 106 may be oriented horizontally, as shown in FIG. 7, for easy access to camera by a user. With camera 106 positioned horizontally, lens 103 faces a target, for example a wall, at known distances from camera 106. Then, the size of FOV 24 of lens 103 may be calculated based on the length, height, or other distance that FOV 24 captures on the target. As such, a ratio is developed which relates the size of FOV 24 based on the distance of camera 106 to the target (e.g., a wall). This known ratio then may be stored as a data point or parameter of camera 106 and lens 103 such that the same ratio may be applied to any of scoring processes 400, 500, 600. More particularly, because rangefinder 104 determines the known distance of camera 106 from ground surface G, the ratio determined in FIG. 7 can be used to calculate the instantaneous size of FOV 24 based on the measurement determined from rangefinder 104 when camera 106 is in a vertical orientation during field operation. By knowing the size of FOV 24 when camera 106 is used in the field, as it is instantaneously varying due to fluctuations in the vertical positioning of aerial platform 18, the positions of target 1000 and/or distances within coordinate area 32 may be determined. Screen coordinate distances can be determined by the user into computer 40 and monitor 42 through clicking on the target and impact positions as previously described during scoring processes 400, 500, 600. These screen coordinate distances can be scaled against the size of the derived instantaneous FOV 24, as ratios of the full FOV, as shown on the full extents of the video image upon the monitor 42, to the partial FOVs represented by the screen coordinate distances. Accordingly, distances along ground, G, as shown in the plan view image are determined.

As may be appreciated, the system 10 is configured to propel an imaging assembly 14 to a desired height above a target, maintain the position of the imaging assembly 14 relative to the target, maintain a nadir position of a camera of the imaging assembly, transmit image and telemetry data from the imaging assembly and a base station, scale the image based upon characteristics of the camera lens, and provide scoring information based upon distance between a target impact point and an actual impact point in the scaled image.

Although the invention has been described in detail with reference to certain preferred embodiments, variations and modifications exist within the spirit and scope of the invention as described and defined in the following claims.

The invention claimed is:

1. A method of determining geo-reference data for a portion of a measurement area, comprising:
 providing a monitoring assembly comprising a ground station which includes an input device and a display device;
 providing an imaging assembly comprising an imaging device with a lens operably coupled to an aerial platform;
 positioning a video transmitter and a video antenna on the aerial platform;
 hovering or flying the aerial platform over a measurement area;
 capturing at least one image of the measurement area within the imaging device;
 transmitting the at least one image to the ground station using the video transmitter and the video antenna; and
 scaling the at least one image where the scaling is performed through at least calculating a size of a field-of-view (FOV) of the lens based on a distance between the imaging device and the measurement area to determine the geo-reference data for the portion of the measurement area based on the scaled at least one image and an offset of the portion of the measurement area of the boresight of the imaging device, where the distance is determined by a rangefinder coupled to the aerial platform.

2. The method of claim 1, wherein calculating the size of the FOV of the lens includes applying a calibration ratio of the lens determined by the size of the FOV of the lens when the imaging device is a known distance from an object.

3. The method of claim 2, wherein the calibration ratio is predetermined prior to scaling the at least one image.

4. The method of claim 1, further comprising identifying a first portion of the measurement area, identifying a second portion of the measurement area, and scaling the at least one image to determine a distance between the first and second portions.

5. The method of claim 1, wherein capturing at least one image of the measurement area includes capturing a first image of an object within the measurement area and capturing a second image of the object within the measurement area.

6. The method of claim 5, further comprising determining a velocity of the object by determining a distance the object traveled within the measurement area during a time between capturing the first image and capturing the second image.

7. The method of claim 1, further comprising positioning the imaging device in a nadir position to capture a plan view of the portion of the measurement area.

8. A method of determining geo-reference data for a portion of a measurement area, comprising:
 providing a monitoring assembly comprising a ground station and a scaling unit, and the ground station including a display device and an input device operably coupled to the display device, and the input device is configured to receive an input from a user to identify at least one target displayed on the display device;
 providing an imaging assembly comprising an imaging device with a lens operably coupled to an aerial device, an inertial measurement unit (IMU) configured to determine movement of the imaging device, and a global navigation satellite system (GNSS) configured to determine geo-reference coordinates of the imaging device;
 providing a data transmitting assembly comprising a telemetry consolidation unit operably coupled monitoring assembly and the imaging assembly;
 orienting the imaging device toward an object at a known distance between the imaging device and the object;
 determining a size of a field-of-view (FOV) of the lens at the known distance;
 calculating a ratio of the size of the FOV relative to the known distance;
 storing the ratio in the scaling unit of the monitoring assembly;
 hovering or flying the aerial device over the measurement area;
 capturing at least one image of the measurement area with the imaging device;
 transmitting, with the data transmitting assembly, the at least one image to the ground station;
 measuring, with the imaging assembly, a distance between the imaging device and the portion of the measurement area;
 transmitting, with the data transmitting assembly, the distance between the imaging device and the portion of the measurement area to the monitoring assembly; and
 scaling, with the scaling unit, the at least one image to determine the geo-reference data for the portion of the measurement area using the ratio stored in the scaling unit.

9. The method of claim 8, wherein measuring the distance between the imaging device and the portion of the measurement area includes providing a laser of the imaging assembly and directing the laser directly downward toward the measurement area.

10. The method of claim 8, further comprising positioning the imaging device in a nadir position and capturing the at least one image includes capturing at least one plan view of the measurement area.

11. The method of claim 8, wherein capturing at least one image of the measurement area includes capturing a first image of an item within the measurement area and capturing a second image of the item within the measurement area.

12. The method of claim 11, further comprising determining a velocity of the item by determining a distance the item traveled within the measurement area during a time between capturing the first image and capturing the second image.

13. The method of claim 8, further comprising identifying a first portion of the measurement area, identifying a second portion of the measurement area, and scaling the at least one image to determine a distance between the first and second portions.

14. The method of claim 8, wherein the measurement area is at least one of land and water.

* * * * *